(12) United States Patent
Solomon

(10) Patent No.: US 6,647,454 B1
(45) Date of Patent: Nov. 11, 2003

(54) DATA TRANSFER THROUGH A BRIDGE

(75) Inventor: Gary A. Solomon, Acton, MA (US)

(73) Assignee: Intel Corporation, Hillsboro, OR (US)

( * ) Notice: Subject to any disclaimer, the term of this patent is extended or adjusted under 35 U.S.C. 154(b) by 529 days.

(21) Appl. No.: 09/670,009

(22) Filed: Sep. 25, 2000

(51) Int. Cl.[7] .............................................. G06F 13/20
(52) U.S. Cl. ....................................... 710/310; 710/314
(58) Field of Search ............................ 710/52, 57, 310, 710/311, 312, 313, 314

(56) References Cited

U.S. PATENT DOCUMENTS 5,594,882 A * 1/1997 Bell .......................... 711/212
6,098,134 A * 8/2000 Michels et al. ............. 710/108
6,421,756 B1 * 7/2002 Kelley et al. ................ 710/310
6,425,024 B1 * 7/2002 Kelley et al. ................. 710/56
RE37,980 E * 2/2003 Elkhoury et al. ........... 710/310

FOREIGN PATENT DOCUMENTS

CA          2302077 A1 * 11/2000 ........... G06F/13/14

* cited by examiner

Primary Examiner—Glenn A. Auve
(74) Attorney, Agent, or Firm—Fish & Richardson P.C.

(57) ABSTRACT

A bridge has a first interface that receives a request through a first bus from a requestor that request to read data, and a second interface that forwards the request through a second bus to a device that connects to a memory. The device obtains the requested data from the memory and forwards to the bridge, which then sends the data to the requestor in an appropriate manner.

14 Claims, 4 Drawing Sheets

DATA TRANSFER THROUGH A BRIDGE

BACKGROUND

This invention relates to data transfer through a bridge device.

A peripheral component interconnect (PCI) bus is a local bus inside a computer system. A PCI-to-PCI (P2P) bridge is a device that connects two independent PCI buses.

There can be a latency in establishing connections through a P2P bridge. One possible source of acquisition latency may be associated with making a connection to a dynamic random access memory (DRAM). Another source of acquisition latency is associated with the time required to acquire the buses for transactions. The DRAM acquisition latency causes buses to be held in a wait state even though they may be in alignment and ready to receive the DRAM data. These wait states reduce the effective bandwidth of the bridge and lengthen the bus acquisition latency for other agents wishing to conduct transactions on those buses, reducing the overall performance of a computer's IO subsystem.

DETAILED DESCRIPTION

Figure 1:
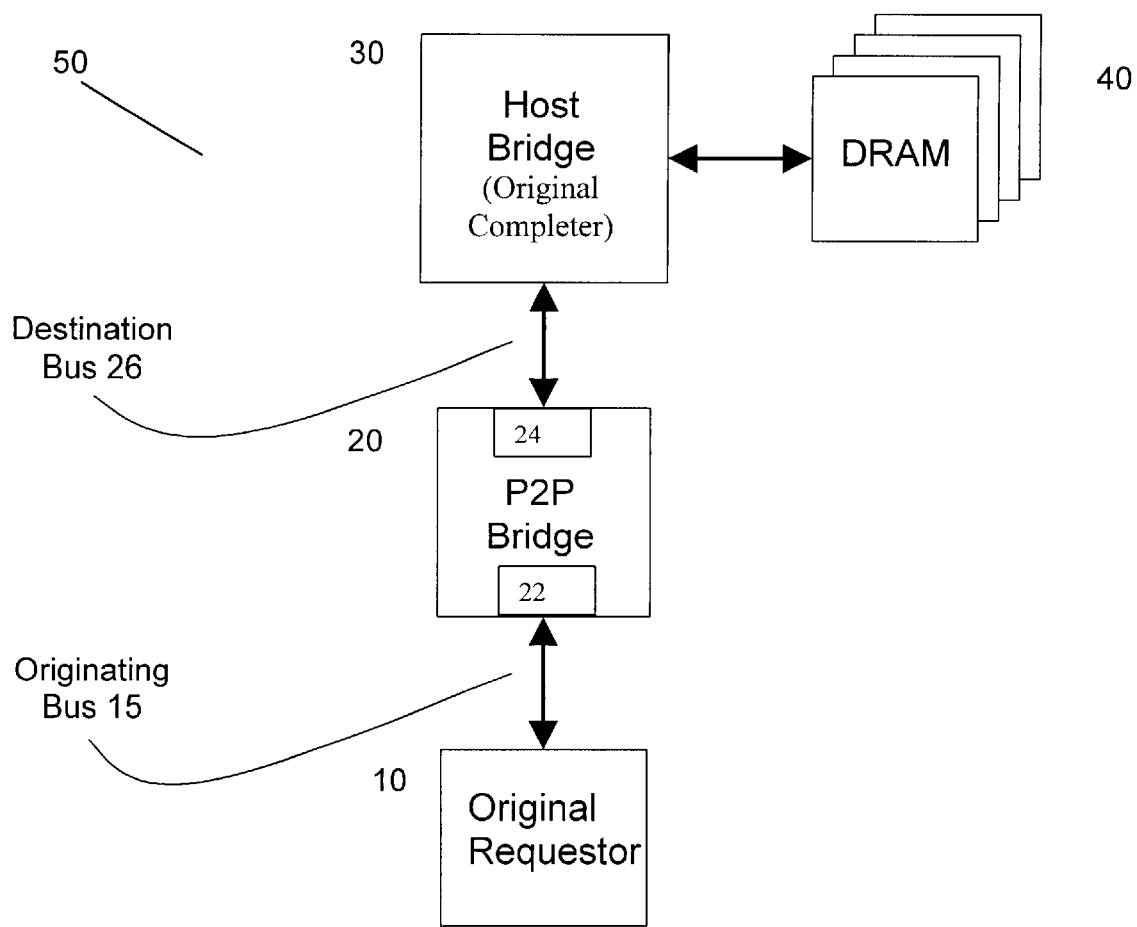
FIG. 1 illustrates a PCI-to-PCI bridge configuration according to an implementation of the invention.

As shown in FIG. 1, a PCI-to-PCI (P2P) bridge configuration 50 includes an original requestor 10 connected to an originating bus 15. The original requestor 10 makes an original request to read data. The originating bus 15 is a bus that transmits the original request. The bus 15 is connected to a P2P bridge 20 at the side of an intermediate completer 22, an interface in the P2P bridge. The intermediate completer accepts the original request to read data. An intermediate requestor 24, another interface in the P2P bridge, is connected to a destination bus 26, which is linked to a host bridge called an original completer 30. The original completer 30 is coupled to a dynamic random access memory (DRAM) 40. The intermediate requestor 24 forwards the original request towards the intended target. The destination bus 26 carries the request, and ultimately the requested data is read from it. The original completer 30 receives the original request and procures the requested data to be sent back to the original requestor 10.

The term "requestor" is used to indicate the interface of a device that initiates or requests a transaction to take place. The term "completer" is used to indicate the interface of a device that responds to the requestor's requests and the location where the requested data appears or is written. The transactions that involve these two types of constituents that are configured to defer transactions in a controlled manner are called deferred transactions. In contrast, an immediate transaction is an operation that is conducted all at once. An example of an immediate transaction for read request involves maintaining control of all data and control paths leading to the memory until the initiator of the request receives the requested data.

A delayed transaction is a form of deferred transaction. The delayed transaction is bound to a bus protocol that does not provide a means for the requestor to uniquely identify itself to the target of the request. Because of this, the requestor continues to poll the target with its request if the target is busy. After some delay in executing the request, the polled target responds to the requestor (delayed completion).

A split transaction is another form of deferred transaction that splits the transactional operation. A split transaction differs from the delayed transaction in that the requestor submits its request with sufficient information regarding its identity such that the target (a completer) of the request can execute the request and deliver the requested data to the requestor. When executing split transactions in FIG. 1, it is the original completer 30 and the intermediate completer 22 that attempt to gain control of the buses 26 and 15, respectively, to deliver the requested data.

For the original requestor 10 to receive data efficiently from the DRAM 40 through the P2P bridge 20, it is desirable to achieve a functional state called "full bus bandwidth read flow-through" or simply read flow-through. A read flow-through state can occur when the original completer 30 has control of the destination bus 26 and delivers the data from the DRAM 40 to the P2P bridge 20, the intermediate completer 22 of the P2P bridge 20 has control of the originating bus 15, and, at the same time, the original requestor 10 is ready to receive the read data from the intermediate completer 22 through the originating bus 15. The buses 15, 26 are in alignment to let the requested data flow-through.

Figure 2:
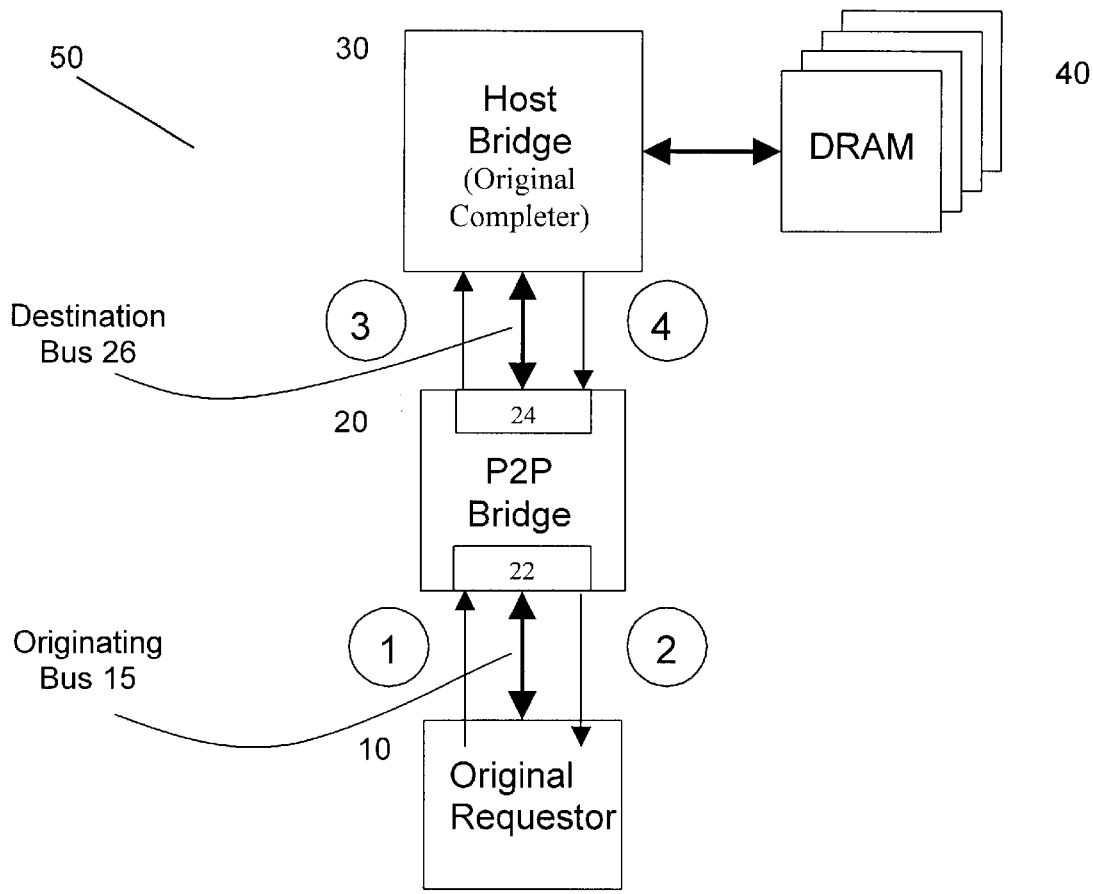
FIG. 2 illustrates the first four phases of the full bus bandwidth read flow-through state according to an implementation of the invention.
Figure 3:
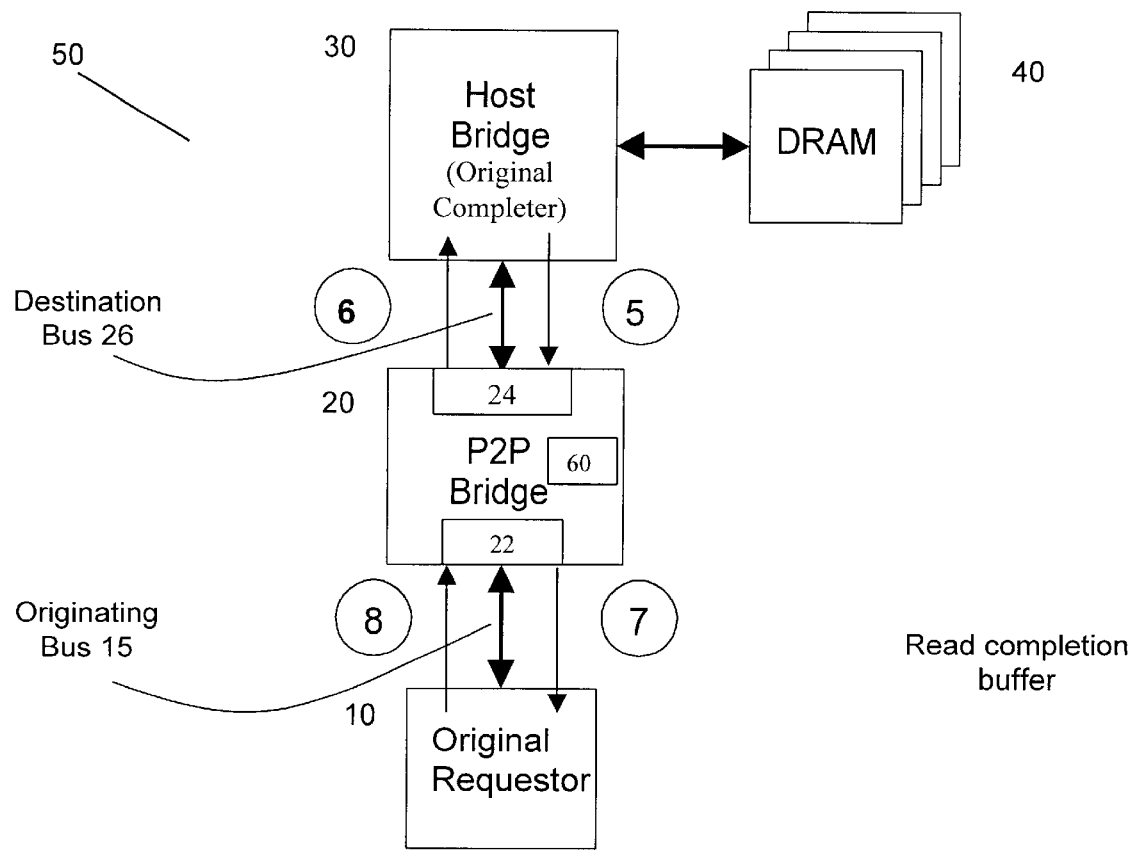
FIG. 3 illustrates the second four phases of the full bus bandwidth read flow-through state according to an implementation of the invention.

FIGS. 2 and 3 illustrate a technique for reading a block of data (read transaction). Two conditions can be enforced to achieve a read flow-through state for the bridge configuration 50 in the split transaction mode. The first condition is that the completers 22, 30 deliver all data that they indicate as specified in the "byte count" field of the completion transaction. The byte count field indicates the size of the read data. The second condition is that requestors 10, 24 on their outstanding requests be ready to accept all completion data without delay. The following implementation illustrates how these conditions can be applied.

At phase 1 as shown in FIG. 2, the original requestor 10 gains control of the originating bus 15 and makes a request for a read transaction to the intermediate completer 22.

At phase 2, the intermediate completer 22 responds by sending a split response termination to the original requestor 10 and by storing a split request in the P2P bridge 20 to pass the request to the intermediate requestor 24. The split response termination indicates to the original requestor 10 that the read transaction has been logged in and that appropriate read data will be returned to the original requestor 10 when available. Upon receiving the split response termination, the original requestor 10 releases the originating bus 15 to other PCI bus agents that can initiate transactions or accept transactions. The splitting of the transaction in the above manner is called a split transaction.

At phase 3, the intermediate requestor 24 gains control of the destination bus 26 and forwards the split request, that is, the original read transaction request, to the original completer 30.

At phase 4, the original completer 30 responds by sending a split response termination to the intermediate requestor 24 and also by queuing a read request for the DRAM 40. The split response termination works in a similar manner as at phase 2. The intermediate requestor 24 releases control of the destination bus 26 after receiving the split response termination, which indicates receipt of the request.

At phase 5 as shown in FIG. 3, after obtaining the requested read data from the DRAM 40, the original completer 30 gains control of the destination bus 26 and signals a split completion transaction to the intermediate requestor 24. The completion data contains information associated with the split request, such as the identity of the original requestor 10. The completion data begins to fill a read completion buffer 60 in the P2P bridge 20.

At phase 6, the intermediate requestor 24 claims the transaction and accepts the requested read data with zero wait states. That is consistent with the second condition of accepting data without any wait states.

At phase 7, while the buffer 60 is being filled with the read data, the intermediate completer 22 attempts to gain control of the originating bus 15. An acquisition latency is associated with gaining access to the originating bus 15.

At phase 8, the read flow-through state is achieved if the intermediate completer 22 gains control of the originating bus 15 while the buffer 60 is being filled with the read data. The byte count field, denoting the size of the read data, is passed from the intermediate completer 22 to the original requestor 10. Once the intermediate completer 22 gains control of the bus 15, the buffered read data in the buffer 60 can start to flow out to the original requestor 10 while the remaining read data from the original completer 30 continues to fill the buffer. The acquisition latency of the originating bus 15 is effectively hidden because the data flow is "cushioned" by the buffer 60 to allow time for acquisition of the originating bus 15. The read data flows from the intermediate completer 22 to the original requestor 10 until the entire read data is transmitted to the original requestor 10.

Even if the entire read data is read into the buffer 60 before the originating bus 15 is accessed by the intermediate completer 22, a read flow-through state can be achieved. As soon as the bus 15 is accessed, the read data contained in the buffer 60 can flow into the original requestor 10. The above cases are consistent with the first condition of transmitting the entire data, the size of which is indicated by the byte count.

If the intermediate requestor 24 is forced to disconnect from the original completer 30 because of insufficient buffer space before the intermediate completer 22 has gained control of the originating bus 15, the read flow-through state is not achieved. In this situation, a split completion transaction is conducted; however it is executed as an abbreviated "store and forward" data transaction. The buffered data is transmitted to the original requestor 10, and when the buffer space becomes available, the remaining data is filled in. When the originating bus 15 is accessed, the remaining data with the remaining byte count is transmitted to the original requestor 10.

During the split transaction sequences described above, the originating bus 15 or the destination bus 26 need not wait while the data is being held for transmission. That is, the buses 15 and 26 are not placed on wait states. This frees the buses 15 and 26 for other unrelated transactions so that higher system throughput can be achieved and many requests can be processed simultaneously.

The P2P bridge 20 can weigh the capacity (i.e. its depth) of the buffer 60 for receiving the split completion transaction versus the acquisition latency of the originating bus 15 and decide whether the forthcoming completion transaction should occur in a flow-though mode or a store-and-forward mode. The read flow-through state can be achieved for most, if not all, split completion transactions by providing sufficient buffer space so that the connection with the original completer 30 is not cut off before the originating bus 15 is accessed.

Furthermore, the acquisition latency may be minimized for a given split completion transaction by giving priority to the intermediate completer's attempt to gain control of the originating bus 15 over other transactions. A minimized acquisition latency and a greater buffer space can increase the probability that the intermediate completer 22 will gain control of the originating bus 15 while the read data is still flowing into the P2P bridge's completion buffer. Once the bus 15 is accessed, the read flow-through state is achieved to let the read data flow into the original requestor 10.

The foregoing implementation eliminates effectively the wait state to achieve a full bus bandwidth read flow-through. Consequently, the performance of the bridge configuration 50 and overall IO throughput of the affected PCI buses is improved.

The foregoing description relates to achieving the read flow-through state by split transaction sequences. However, there are instances when the original completer 30 responds immediately to the intermediate requestor 24 so that data is returned immediately upon receiving a request for the data. The assumption is that this type of transaction occurs rarely. Although the P2P bridge 20 can be designed to accept and retain immediate data, such features can lead to a more complex bridge design. Another assumption is that with respect to a read request that travels upstream toward a host memory associated with a host processor (for example, the DRAM 40 connected to a main CPU), there are no read side effects, in other words, no effect that causes inadvertent state changes in the computer system when data related to control registers or status registers are read. That effect can occur when data is received immediately from a downstream resource, for example, a memory source associated with a local processor rather than a memory source associated with a host processor.

Figure 4:
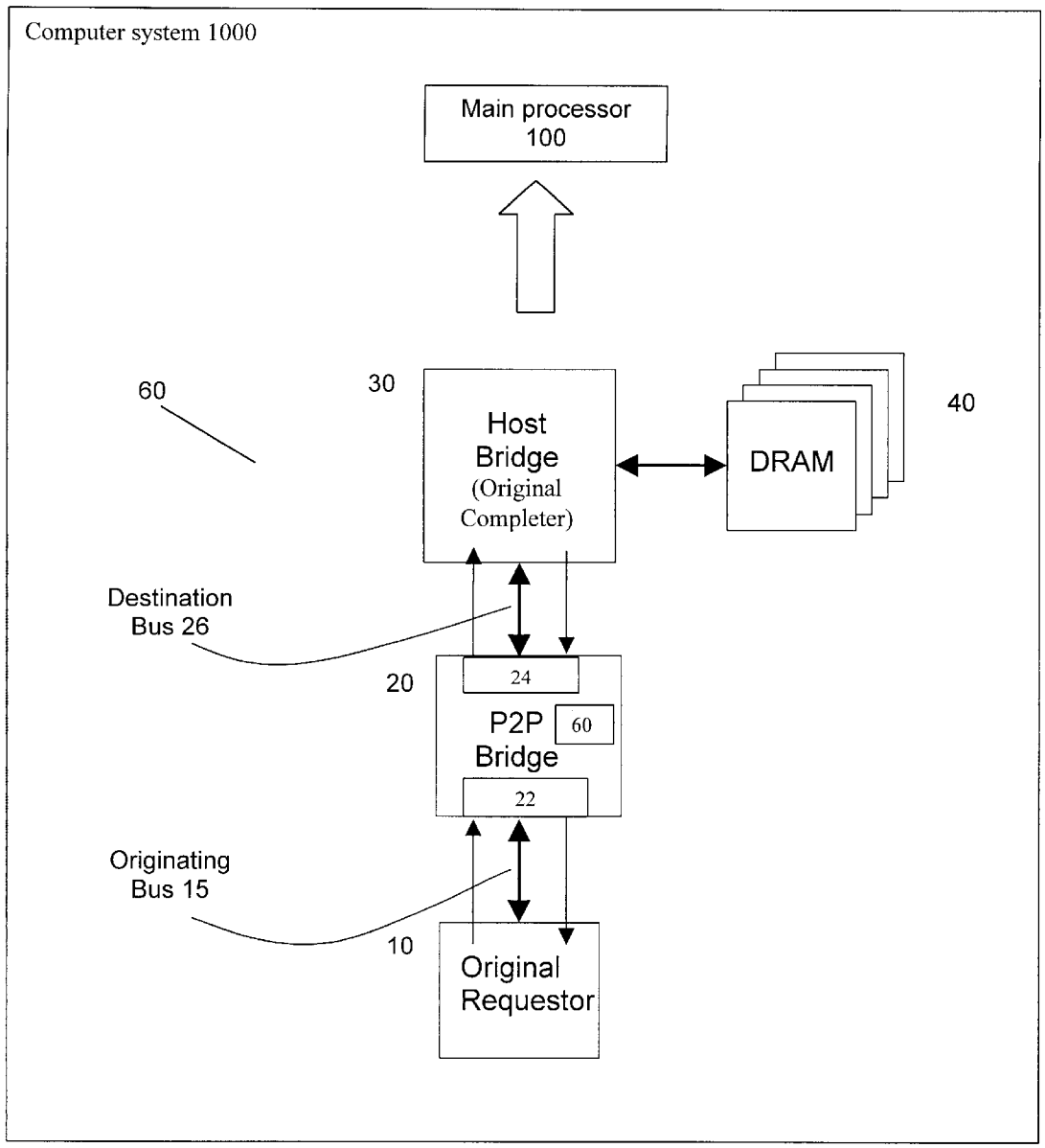
FIG. 4 illustrates a computer system with the locations of a host processor in reference to the PCI-to-PCI bridge configuration according to an implementation of the invention.

FIG. 4 describes how data transmitted immediately from the DRAM 40 assumed to be connected to a main processor 100 can be handled in a computer system 1000. The sequence of events leading up to the split request being transmitted to the original completer 30 is similar to phases 1 to 4 as in FIG. 2. Thus, the original requestor 10 sends a read request to the intermediate completer 22, which responds by sending a split response termination to the original requestor 10 and by storing a split request within the P2P bridge 20 to be accessed by the intermediate requestor 24. The intermediate requestor 24 then forwards the split request to the original completer 30. In contrast to the previous example of FIG. 2, the original completer 30 responds immediately to the request with the requested data from the DRAM 40.

To be consistent with the second condition that a requestor accept data without any wait states (i.e. zero wait states), the intermediate requestor 24 starts to take in the immediate data from the original completer 30. However, because the capacity or the availability of the read completion buffer 60 is unknown, the data is discarded, and the connection with the original completer 30 is severed at the next allowable disconnect boundary. The P2P bridge 20 sets a flag to acknowledge that the immediate data was read but was discarded. It also sets a flag to reissue the request to read the data at some later time when there is at least sufficient space available in the buffer 60 to store an allowable disconnect quanta (ADQ). The ADQ is a minimum block of data that can be stored in the buffer 60 (e.g. 128 bytes). The data can be discarded and re-read because it is assumed that there were no read side effects when the initial read took place. Under normal split transactions, a request for data by the intermediate requestor 24 is issued independently of the availability of the buffer space in the buffer 60 because at the time of the request by the original requestor 10, buffer availability does not have to be considered. However, with the reissue of the request by the intermediate requestor 24, the availability of buffer space does become a concern. A logic circuit that checks the status on buffer availability can be provided in the P2P bridge 20.

If a request to read peripheral data is made to a downstream resource and the peripheral data is immediately returned, the read side effect is a factor to be considered. A downstream resource refers to a resource that resides on a PCI bridge's secondary bus, which is distinguished from a primary bus that is topologically closer to the main processor. In FIG. 4, the primary bus would be the destination bus 26 and the secondary bus would be the originating bus 15. Unlike the case for an upstream resource that resides on the primary bus, the immediately returned data cannot simply be discarded and the request reissued. The issuance of request to read the peripheral data from the downstream resource should be determined in view of buffer availability as a gating item. By providing logic that evaluates the buffer availability, the P2P bridge 20 can accept the immediately returned data up to a legitimate disconnection boundary without suffering from the read side effect.

Other implementations are within the scope of the following claims.

What is claimed is:

1. A bridge device comprising:

a first interface to receive, through a first bus, a request to read data from a requestor;

a second interface to forward the request through a second bus to a device, wherein the first interface is arranged to send a first response to acknowledge the request and to cause the first bus to be released, and wherein the second interface is arranged to receive requested data obtained by the device from a memory; and a buffer memory that is arranged to accept the requested data received through the second interface, wherein if the first interface gains control of the first bus while the buffer memory is being filled with the requested data, the first interface is arranged to send the requested data stored in the buffer memory to the requestor while the buffer memory is being filled with the rest of the requested data.

2. A bridge device comprising:

a first interface to receive, through a first bus, a request to read data from a requestor;

a second interface to forward the request through a second bus to a device, wherein the first interface is arranged to send a first response to acknowledge the request and to cause the first bus to be released, and wherein the second interface is arranged to receive requested data obtained by the device from a memory; and a buffer memory that is arranged to accept the requested data received through the second interface, wherein if the buffer memory becomes unavailable to read the requested data before the first interface gains control of the first bus and the connection with the device is cut off, the requested data stored in the buffer memory is forwarded to the requestor after the first interface gains control of the first bus; and the device is arranged to send to the second interface at least a portion of the rest of the requested data when the buffer memory becomes available.

3. A bridge device comprising:

a first interface to receive, through a first bus, a request to read data from a requestor; and a second interface to forward the request through a second bus to a device, wherein the first interface is arranged to send a first response to acknowledge the request and to cause the first bus to be released, wherein the device is arranged to send requested data immediately from a memory to the second interface, wherein the second interface is arranged to discard the requested data, and wherein the second interface is arranged to reissue a request to read the requested data to the device when there is sufficient space in the buffer memory to accept at least a portion of the requested data.

4. The bridge device according to claim 3 wherein the first interface is arranged to gain control of the first bus and forward the requested data to the requestor.

5. A Bridge configuration comprising:

a requestor for requesting to read data;

a bridge for receiving a request from the requestor;

a host bridge for receiving a request from the bridge;

a first bus that connects the requestor and the bridge; and a second bus that connects the bridge and the host bridge, wherein the bridge is arranged to send a first response to the requestor to acknowledge the request and to cause the requestor to release control of the first bus, wherein the host bridge is arranged to respond to the bridge to acknowledge receipt of the request from the bridge and cause the bridge to release control of the second bus, and to forward the request to a memory, wherein the host bridge is arranged to gain control of the second bus and to forward the data obtained from the memory to the bridge; and while attempting to gain control of the first bus, the bridge is arranged to accept the data into a buffer memory in the bridge, and wherein if the bridge gains control of the first bus while the data is being read into the buffer memory, the bridge is arranged to forward the data in the buffer memory to the requestor while the rest of the data is being filled in the buffer memory.

6. A Bridge configuration comprising:

a requestor for requesting to read data;

a bridge for receiving a request from the requestor;

a host bridge for receiving a request from the bridge;

a first bus that connects the requestor and the bridge; and a second bus that connects the bridge and the host bridge, wherein the bridge is arranged to send a first response to the requestor to acknowledge the request and to cause the requestor to release control of the first bus, wherein the host bridge is arranged to respond to the bridge to acknowledge receipt of the request from the bridge and cause the bridge to release control of the second bus, and to forward the request to a memory, wherein the host bridge is arranged to gain control of the second bus and to forward the data obtained from the memory to the bridge; and while attempting to gain control of the first bus, the bridge is arranged to accept the data into a buffer memory in the bridge, and wherein if the buffer memory becomes unavailable to read the data before the bridge gains control of the first bus and the connection with the host bridge is cut off, the data already stored in the buffer memory is arranged to be forwarded to the requestor after the bridge gains control of the first bus; and the host bridge is arranged to send to the bridge at least a portion of the rest of the data when the buffer memory becomes available.

7. A Bridge configuration comprising:

a requestor for requesting to read data;

a bridge for receiving a request from the requestor;

a host bridge for receiving a request from the bridge;

a first bus that connects the requestor and the bridge; and a second bus that connects the bridge and the host bridg, wherein the bridge is arranged to send a first response to the requestor to acknowledge the request and to cause the requestor to release control of the first bus, and wherein the host bridge is arranged to send the data immediately to the bridge in response to the request by the bridge; the bridge is arranged to accept but discard the data and to gain control of the second bus to reissue a request to read the data from the host bridge when a buffer memory in the bridge is confirmed to have sufficient space available.

8. The bridge configuration according to claim 7 wherein the bridge is arranged to gain control of the first bus to send the data to the requestor while the buffer memory is being filled with the data from the host bridge.

9. A method of transferring data in a bridge configuration comprising:

acquiring control of a first bus that connects a first device to a bridge;

sending a request to read data to the bridge;

sending a first response from the bridge to the first device to release control of the first bus;

acquiring control of a second bus that connects a second device to the bridge;

forwarding the request to the second device;

responding to the request by sending a second response to the bridge to release control of the second bus;

forwarding the request to a memory containing the data requested;

obtaining data from the memory and gaining control of the second bus to send the requested data into a buffer memory in the bridge from the second device; and sending the requested data stored in the buffer memory to the first device if the bridge acquires control of the first bus while the data is being read into the buffer memory.

10. A method of transferring data in a bridge configuration comprising:

acquiring control of a first bus that connects a first device to a bridge;

sending a request to read data to the bridge;

sending a first response from the bridge to the first device to release control of the first bus;

acquiring control of a second bus that connects a second device to the bridge;

forwarding the request to the second device;

responding to the request by sending a second response to the bridge to release control of the second bus;

forwarding the request to a memory containing the data requested;

obtaining data from the memory and gaining control of the second bus to send the requested data into a buffer memory in the bridge from the second device; and if the buffer memory becomes unavailable to read the data further before the bridge gains control of the first bus and the connection with the second device is cut off, forwarding the requested data already stored in the buffer memory to the first device after the bridge gains control of the first bus.

11. The method according to claim 10 further comprising:

sending from the second device at least a portion of the rest of the data to be forwarded to the first device when the buffer memory becomes available.

12. A method of transferring data in a bridge configuration comprising:

acquiring control of a first bus that connects a first device to a bridge;

sending a request to read data to the bridge;

sending a first response from the bridge to the first device to release control of the first bus;

acquiring control of a second bus that connects a second device to the bridge;

forwarding the request to the second device;

responding to the request by sending a second response to the bridge to release control of the second bus;

forwarding the request to a memory containing the data requested;

obtaining data from the memory and gaining control of the second bus to send the requested data into a buffer memory in the bridge from the second device;

responding to the request by sending the requested data to the bridge;

accepting and discarding the requested data; and reissuing a request to read the requested data to the second device when a buffer memory in the bridge is available to accept at least a portion of the requested data; and forwarding the requested data stored in the buffer memory to the first device after acquiring control of the first bus.

13. A computer system comprising:

a requestor for requesting to read data;

a bridge for receiving a request from the requestor;

a host bridge for receiving a request from the bridge;

a microprocessor;

a memory connected to the microprocessor and to the host bridge;

a first bus that connects the requestor and the bridge; and second bus that connects the bridge and the host bridge, wherein the bridge is arranged to send a first response to the requestor to acknowledge the request and to cause the requestor to release control of the first bus, wherein the host bridge is arranged to send a second response to the bridge to acknowledge receipt of the request from the bridge and cause the bridge to release control of the second bus, and to forward the request to the memory; the host bridge is arranged to gain control of the second bus and to forward the data obtained from the memory to the bridge; and while attempting to gain control of the first bus, the bridge is arranged to accept the data into a buffer memory in the bridge, and wherein if the bridge gains control of the first bus while the data is being read into the buffer memory, the bridge is arranged to forward the data to the requestor while the rest of the data is being filled in the buffer memory; if the bridge gains control of the first bus after the data is read into the buffer memory, the bridge is arranged to forward the data to the requestor; but if the buffer memory becomes unavailable to read the data before the bridge gains control of the first bus and the connection with the host bridge is cut off, the bridge is arranged to forward the data already stored in the buffer memory to the requestor when the bridge gains control of the first bus; and the host bridge is arranged to send to the host bridge at least a portion of the rest of the data when the buffer memory becomes available.

14. A computer system comprising:

a requestor for requesting to read data;

a bridge for receiving a request from the requestor;

a host bridge for receiving a request from the bridge;

a first bus that connects the requestor and the bridge; and a second bus that connects the bridge and the host bridge, wherein the bridge is arranged to send a first response to the requestor to acknowledge the request and to cause the requestor to release control of the first bus, and wherein the host bridge is arranged to send the data immediately to the bridge in response to the request by the bridge; the bridge is arranged to accept but discard the data and to gain control of the second bus to reissue a request to read the data to the host bridge when a buffer memory in the bridge has sufficient space available; the bridge is arranged to gain control of the first bus to send the data to the requestor while the buffer memory is being filled with the data from the host bridge or when the buffer memory is filled with the data from the host bridge.

* * * * *